United States Patent [19]
Mischenko et al.

[11] Patent Number: 4,561,142
[45] Date of Patent: Dec. 31, 1985

[54] DISC CLEANER

[75] Inventors: Peter S. Mischenko, Mount Prospect, Ill.; George T. Buehl, Columbia, Mo.

[73] Assignee: International Jensen Incorporated, Schiller Park, Ill.

[21] Appl. No.: 568,732

[22] Filed: Jan. 6, 1984

[51] Int. Cl.$^4$ ............................................. B08B 11/02
[52] U.S. Cl. .................................. 15/97 R; 15/21 C
[58] Field of Search ................... 15/21 R, 21 C, 21 D, 15/21 E, 97 R, 102, 77, 310, 311; 369/72, 74; 360/137; 134/6

[56] References Cited

U.S. PATENT DOCUMENTS

| | | | |
|---|---|---|---|
| 3,150,401 | 9/1964 | Taylor et al. | 15/21 R X |
| 3,803,660 | 4/1974 | Jividen et al. | 15/21 C |
| 4,107,810 | 8/1978 | Varni et al. | 15/97 R |
| 4,202,071 | 5/1980 | Scharpf | 15/21 D X |

*Primary Examiner*—Edward L. Roberts
*Attorney, Agent, or Firm*—Willian, Brinks, Olds, Hofer, Gilson & Lione

[57] ABSTRACT

A disc cleaning device is disclosed which includes a disc support platform mounted to rotate about a first axis. This platform is adapted to support a disc to be cleaned and to center the disc to be cleaned about the first axis. An annular cleaning surface is mounted to rotate about a second axis spaced from the first axis. This cleaning surface is positioned to contact a disc to be cleaned supported on the platform. The platform and the cleaning surface are rotated such that the cleaning surface rotates at twice the angular velocity of the platform. The cleaning surface defines an effective radius equal to the separation between the first and second axes. It has been discovered that this geometry and arrangement of velocities ensures that relative movement between the cleaning surface and the disc to be cleaned is oriented substantially radially with respect to the first axis in order to provide a substantially radially oriented cleaning of at least an annular portion of the disc to be cleaned. Certain preferred embodiments include a mechanism for moving any selected one of two cleaning discs into the preferred geometry in order to allow a sequential washing and drying action with separate cleaning discs.

30 Claims, 11 Drawing Figures

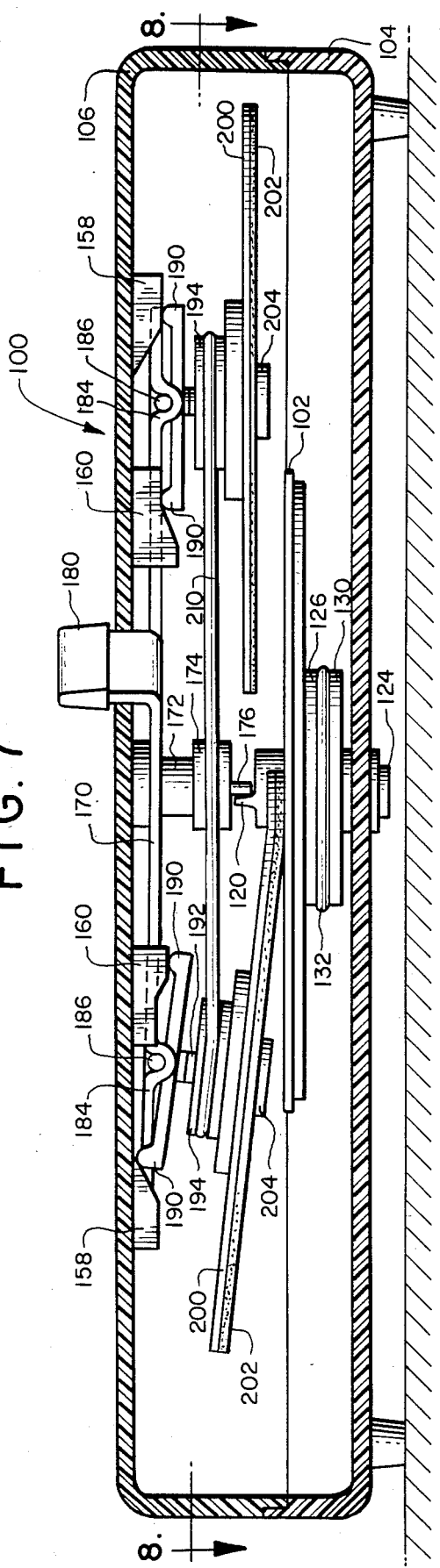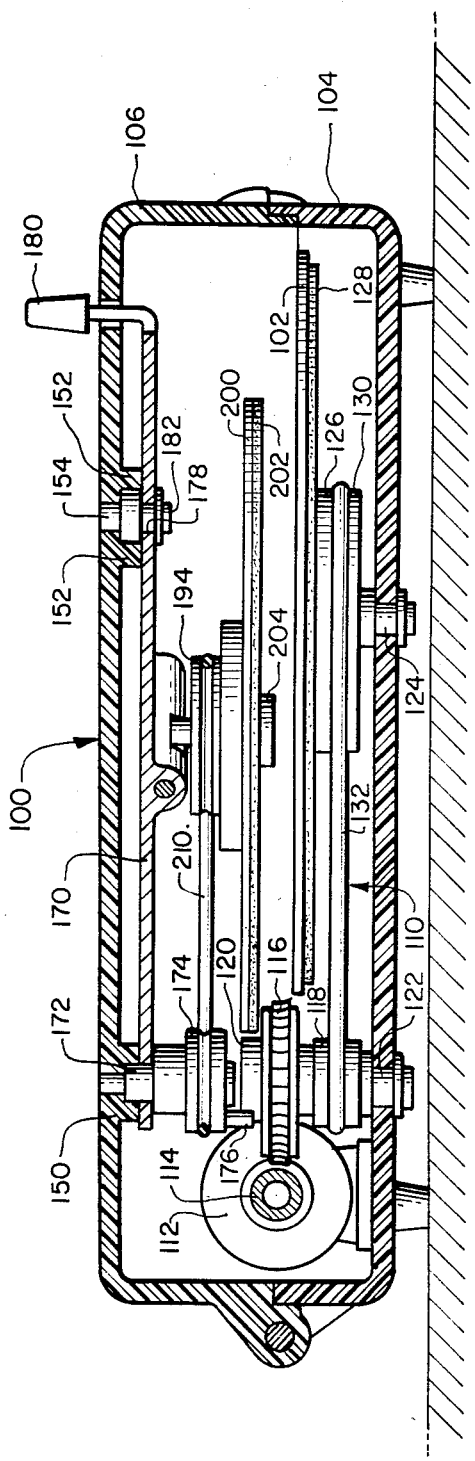

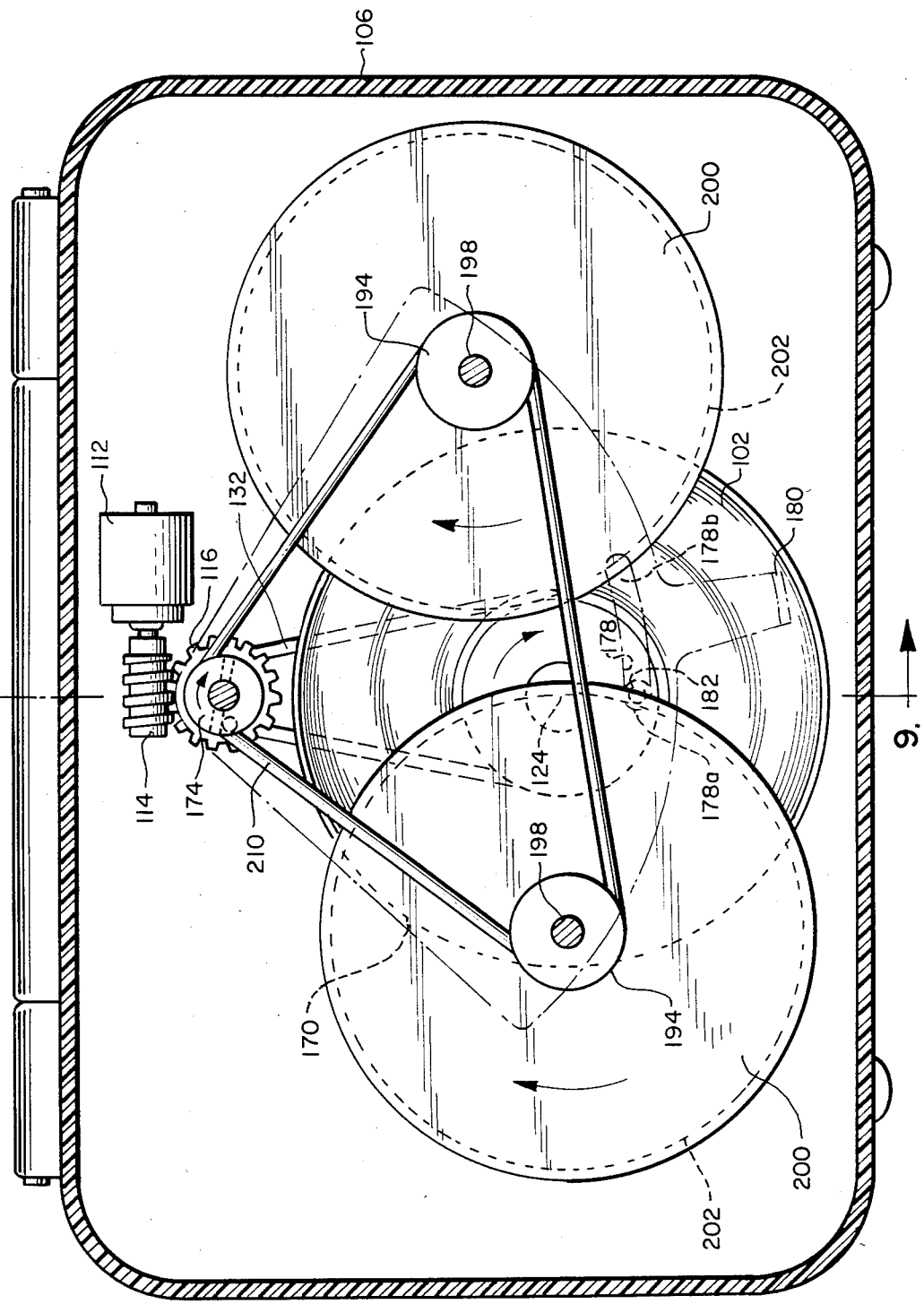

DISC CLEANER

BACKGROUND OF THE INVENTION

This invention is related to a cleaner which operates to clean a disc such as a digital audio disc by means of a substantially radial wiping action.

Digital audio discs present a unique set of cleaning requirements. Because of the reading and tracking mechanisms used, tangentially or concentrically oriented scratches or marks on the disc can interfere with proper tracking and playback. However, radially oriented marks or scratches on the disc are largely ignored by commonly available reading mechanisms.

In this regard, the digital audio disc is fundamentally different from conventionally grooved phonographic records. In conventionally grooved phonographic records, radially oriented scratches can cause significant problems, and conventional cleaning devices for grooved records have largely focused on concentric wiping actions. It is for this reason that conventional cleaning devices developed for use with grooved phonographic records are not well adapted for use with digital audio discs.

SUMMARY OF THE INVENTION

The present invention is directed to an improved cleaning device which operates to minimize the incidence of concentric or tangential marks and scratches on a disc being cleaned.

According to this invention, a disc cleaner is provided which provides a disc support platform mounted to rotate about a first axis. This platform is adapted to support a disc to be cleaned and to center the disc to be cleaned about the first axis. In addition, a cleaning surface is mounted to rotate about a second axis spaced from the first axis. The cleaning surface is positioned to contact a disc to be cleaned which is supported on the platform. The platform and the cleaning surface are rotated about their respective axes and the rotational rate of the cleaning surface is made to vary as a function of the rate of rotation of the platform. The spacing between the first and second axes, the shape of the cleaning surface, and the rate of rotation of the cleaning surface with respect to the platform all cooperate to ensure that relative movement between the cleaning surface and the disc to be cleaned is oriented substantially radially with respect to the first axis to provide a substantially radial cleaning of at least an annular portion of the disc to be cleaned.

In the preferred embodiment described below, two annular cleaning pads are provided along with means for supporting the two cleaning pads such that any selected one of the two cleaning pads can be positioned to contact the disc to be cleaned, with the selected cleaning pad positioned to overlie the first axis. This structure allows a first one of the two cleaning pads to be wetted with a cleaning solution in order to provide effective cleaning, and then the second of the two cleaning pads to be used to remove any remaining cleaning solution from the disc.

The preferred embodiments described below are simple to operate and provide the important advantage of substantially radially oriented cleaning motions between the cleaning pad and the disc being cleaned.

The invention itself, together with further objects and attendant advantages, will best be understood by reference to the following detailed description, taken in conjunction with the accompanying drawings.

BRIEF DESCRIPTION OF THE DRAWINGS

FIG. 7 is a longitudinal sectional view taken along line 7—7 of FIG. 6.

FIG. 8 is a plan sectional view taken along line 8—8 of FIG. 7.

FIG. 9 is transverse sectional view taken along line 9—9 of FIG. 8.

DETAILED DESCRIPTION OF THE PRESENTLY PREFERRED EMBODIMENTS

Turning now to the drawings, FIGS. 1 through 5 will be used to illustrate the basic operating principles of the preferred embodiments of this invention, and FIGS. 6 through 11 disclose a presently preferred mechanism which embodies this invention.

It has been discovered that the desired radial cleaning action can be provided in a surprisingly simple and uncomplicated manner without oscillating movements or the like. The embodiments described below clean a disc rotating at a first rate by means of an annular cleaning disc which rotates at a rate related to that of the disc to be cleaned. It would appear that such an arrangement would result in considerable concentric movement of the cleaning disc with respect to the rotating disc to be cleaned. However, it has been discovered that by providing the proper geometry and the proper relationship between the speed of rotation of the cleaning disc and the speed of rotation of the disc to be cleaned, undesired tangential relative movement between the two discs can be made to cancel out such that the resulting relative movement is entirely radial.

Figure 1:
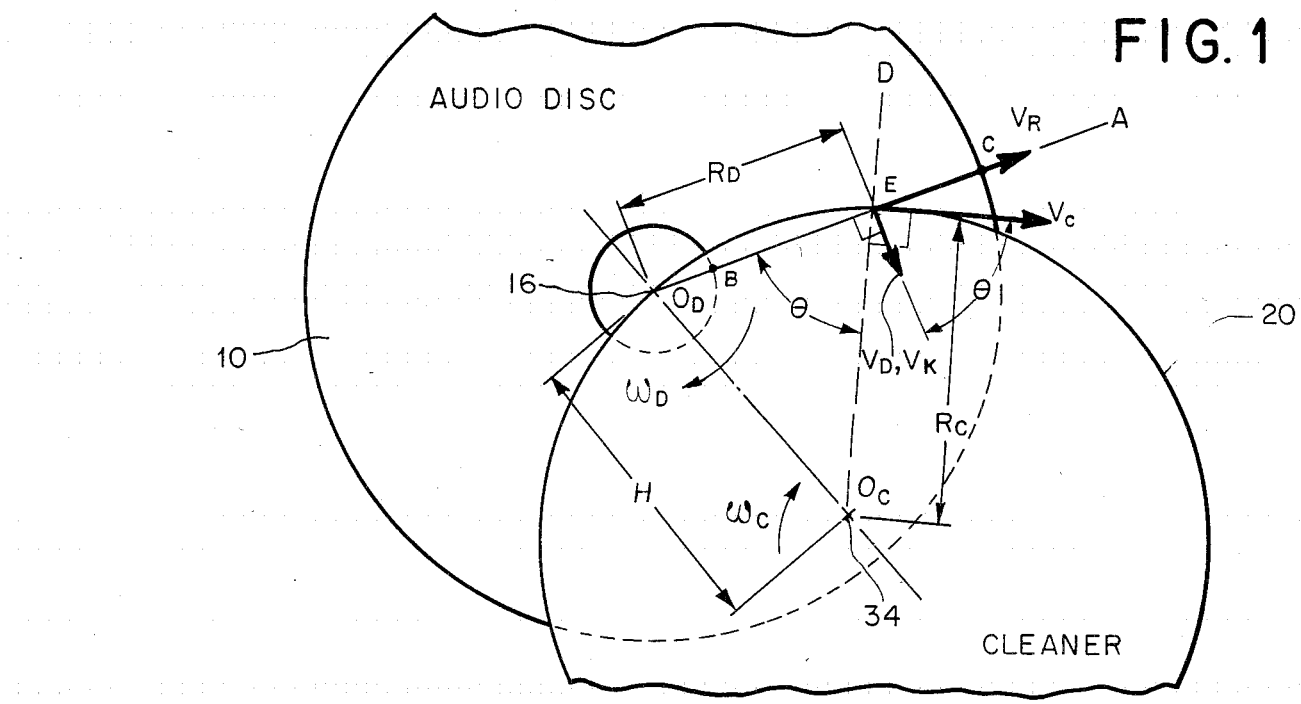
FIG. 1 is a schematic representation of the geometry of a cleaning disc which embodies the present invention.

Turning now to FIG. 1, a disc to be cleaned such as a digital audio disc is marked by the reference numeral 10. This disc 10 rotates about an axis 16 at an angular velocity $W_D$ in a clockwise direction as shown in FIG. 1. In FIG. 1 the reference symbol $O_D$ is used to indicate the center of the disc 10. Also shown in FIG. 1 is a schematic representation of an annular cleaning surface 20 which is centered on an axis 34. In FIG. 1, the cleaning surface 20 rotates about its center $O_C$ with an angular velocity $W_C$ in the same direction as the disc 10. In FIG. 1 reference symbol H is used to designate the separation between the centers $O_D$, $O_C$.

For purposes of analysis, point E will be considered. Point E is on the surface of the disc 10 at a distance $R_D$ from the center $O_D$. The velocity of the point E is identified by the symbol $V_D$ and is equal to $R_D \cdot W_D$. Point E is on the radial line $O_D A$ of the audio disc 10. Point E is also on the arc of the cleaning surface 20, and is therefore also on the radial line $O_CD$ of the cleaning surface 10. The tangential velocity of the cleaning surface 20 at point E is identified by the reference symbol $V_C$ and is equal to $R_C \cdot W_C$. $V_C$ is a vector oriented at an angle $\theta$ with respect to $V_D$. This angle $\theta$ is defined by the triangle $O_D$, E, $O_C$ whose sides are length H, $R_D$, $R_C$.

In order to obtain the preferred radial wiping action H, $R_C$, $R_D$, $W_D$, $W_C$ must be chosen such that, if $V_C$ is broken down into its radial and tangential components $V_R$, $V_K$ (where $V_R$ is at right angles to $V_D$ and $V_K$ is parallel to $V_D$), $V_D$ and $V_K$ are made equal to each other. When this happens, the relative velocity between $V_K$ and $V_D$ is equal to 0, leaving only the velocity component $V_R$ which is radial with respect to the center $O_D$ of the disc 10. If the various parameters can be selected such that $V_K$ is equal to $V_D$ for each point on the disc 10 between points B and C, then the entire recorded surface area of the disc 10 can be cleaned through exclusively radially directed wiping motions.

In order to determine the preferred geometry which would provide the desired radially oriented wiping action, the following equations were used:

$$\theta = 2 \cdot \arctan\left(\frac{R}{S-H}\right), \text{ in which}$$

$$S = \tfrac{1}{2}(H + R_D + R_C),$$

$$R = \left[\frac{(S-H)(S-R_D)(S-R_C)}{S}\right]^{\tfrac{1}{2}},$$

$$V_D = R_D \cdot W_D,$$

$$V_C = R_C \cdot W_C,$$

$$V_K = V_C \cos\theta,$$

$$V_R = V_C \sin\theta$$

$$V_D = R_D \cdot W_D,$$

$$V_C = R_C \cdot W_C,$$

$$V_K = V_C \cos\theta,$$

$$V_R = V_C \sin\theta$$

This equation was used to find the optimal geometry for the case of a standard compact disc or digital audio disc in which the recorded area is an annular surface having an inner diameter of 0.9 inches and an outer diameter of 2.3 inches. Once the appropriate calculations were made, the surprising result was found that a substantially perfect match wherein $V_D$ was equal to $V_K$ is obtained for the entire recorded area of a digital audio disc when H was set equal to RC. and $W_C$ set equal to $2 \times W_D$. (H may be set to 2.1 inches, for example.) Subsequent analysis established that when these parameters were used, $V_D$ and $V_K$ were equal to one another throughout the recorded area of the audio disc and the only relative movement between the cleaning surface 20 and the audio disc 10 was radially directed. In general, for any disc with outside radius $R_{DMAX}$ the optimal geometry for radial cleaning occurs when $R_C$ is equal to H, H is greater than $\tfrac{1}{2} R_{DMAX}$, and $W_C$ is equal to $2 \cdot W_D$. In general, the larger $R_C$ and H become relative to $R_{DMAX}$, the larger the relative radial velocity $V_R$ becomes. The converse also holds. Also, as $R_C$ and H approach $\tfrac{1}{2} R_{DMAX}$, $V_R$ approaches zero at $R_{DMAX}$. If $R_C$ and H are less than $R_{DMAX}$, the periphery of the disc is not cleaned.

Figure 2:
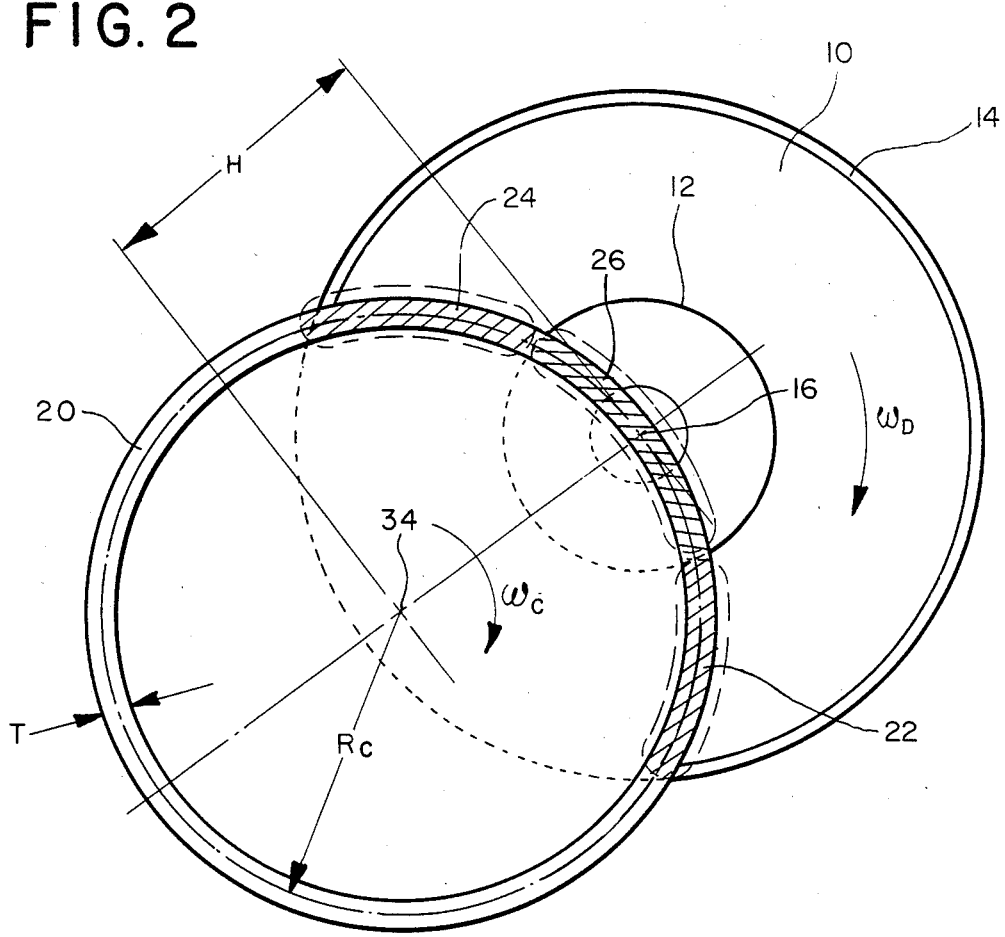
FIG. 2 is a further schematic representation of the cleaning disc geometry of FIG. 1.

It has been assumed up to this point that the cleaning surface 20 is without width. In practice, the cleaning surface 20 has a width T. FIG. 2 shows a schematic representation of the disc 10 and the cleaning surface 20. The optimal radius $R_C$ falls within the width T of the cleaning surface 20. Points at either side of the optimal circle defined by the radius $R_C$ scrub the disc 10 at slight angles with respect to the radial. If desired, it is possible to set $R_C$ equal to the outside radius of the cleaning surface 20 in order to ensure that the last contact between the cleaning surface 20 and the disc 10 is at the optimal radius.

If the axis 34 is tilted with respect to the axis 16, the area of contact between the cleaning surface 20 and the disc 10 can be positioned as desired. For example, by tilting the axis 34 to the right as shown in FIG. 2, the area of contact between the cleaning surface 20 and the disc 10 can be restricted to the contact area 22. In this contact area 22, the relative movement or wiping action between the cleaning surface 20 and the disc 10 is oriented radially outward with respect to the axis 16. Similarly, if the axis 34 is tilted upwardly as shown in FIG. 2, the cleaning surface 20 can be made to contact the disc 10 in a cleaning area 24, in which the wiping action between the cleaning surface 20 and the disc 10 is oriented radially inward, toward the axis 16. If the axis 34 is made parallel to the axis 16, the cleaning surface 20 can be made to contact the disc 10 through a wide arc which includes both of the contact areas 22 and 24 as well as an additional contact area 26. In FIG. 2, the reference numerals 12 and 14 are used to denote the inner and outer perimeters, respectively, of the recorded area of the disc 10.

Figure 3:
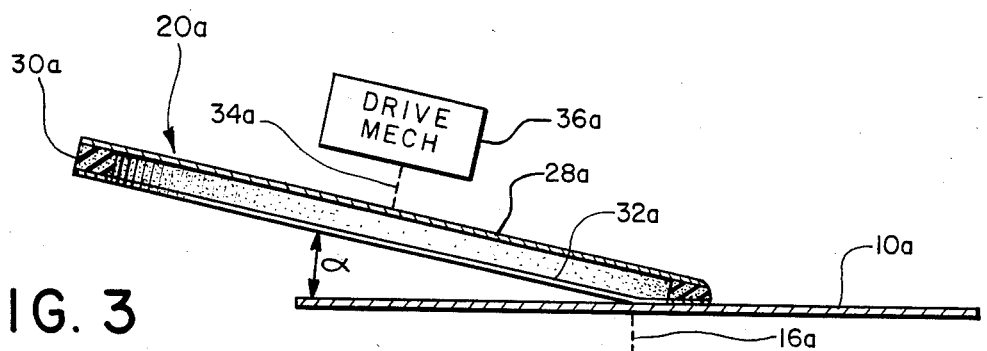
FIG. 3 is a schematic representation of a first preferred embodiment of this invention.
Figure 4:
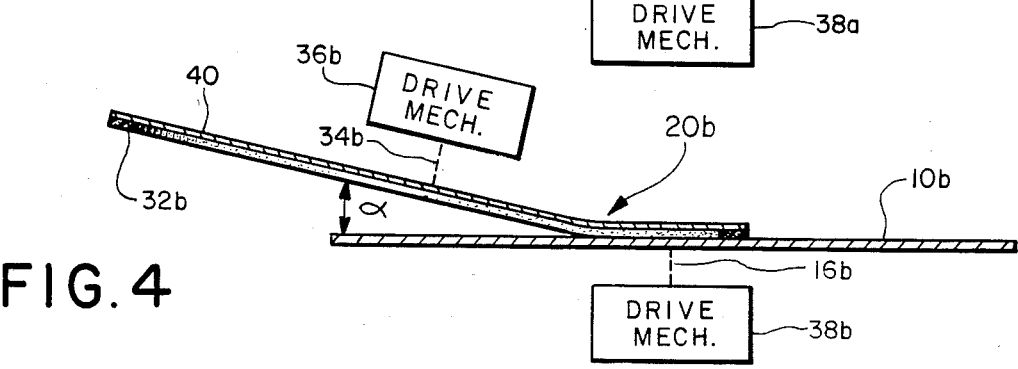
FIG. 4 is a schematic representation of a second preferred embodiment of this invention.
Figure 5:
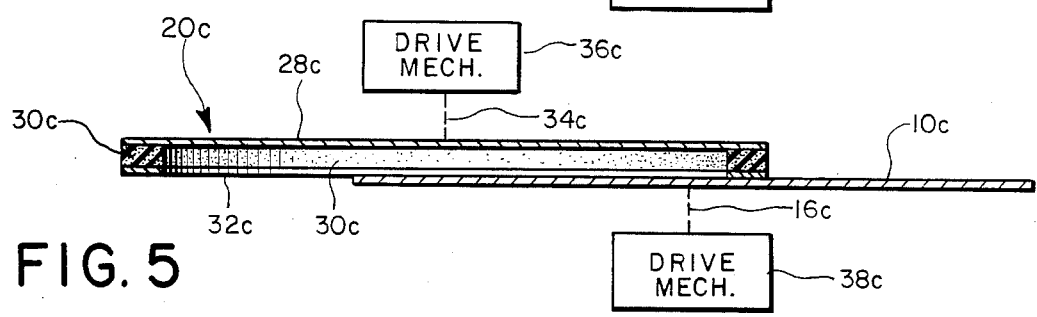
FIG. 5 is a schematic representation of a third preferred embodiment of this invention.
Figure 6:
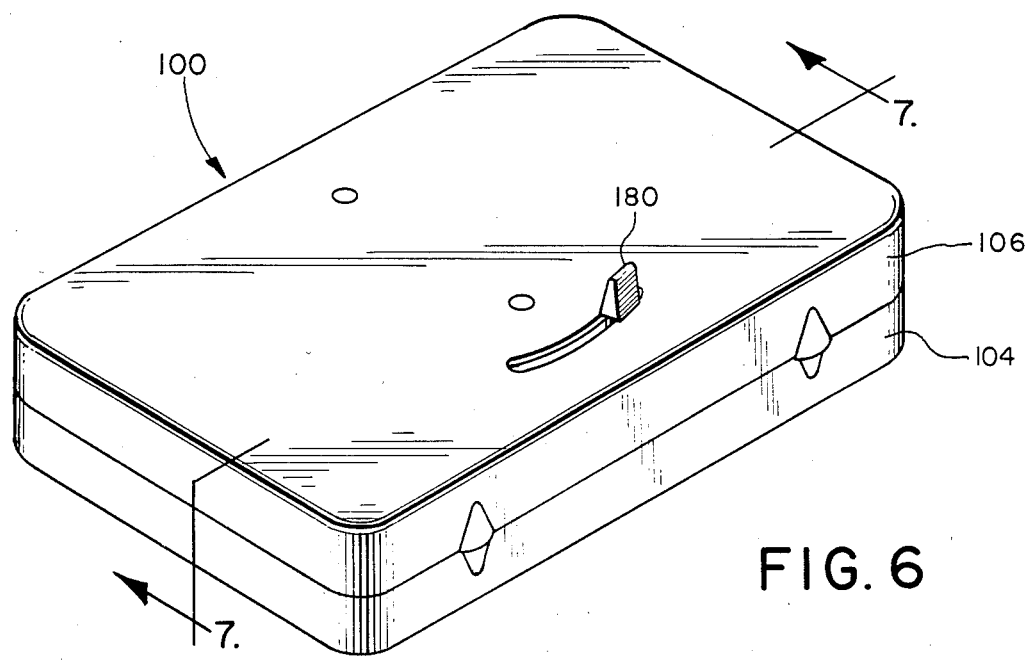
FIG. 6 is a perspective view of a fourth preferred embodiment of this invention.

FIGS. 3, 4 and 5 show schematic representations of three alternate embodiments of this invention. In FIG. 3, the disc to be cleaned 10a is rotated about an axis 16a by means of a drive mechanism 38a. A cleaning disc 20a is rotated about an axis 34a by a drive mechanism 36a. The axis 34a is tilted with respect to the axis 16a by an angle $\alpha$. The cleaning disc 20a is made up of a rigid disc 28a to which is mounted a foam disc 30a. This foam disc 30a serves to mount an annular cleaning pad 32a. The cleaning pad 32a is flexible, and the foam disc 30a is resilient, such that the cleaning pad 32a bends where it comes into contact with the disc 10a and only the annular cleaning pad 32a contacts the disc 10a. As described above, the cleaning disc 20a is rotated in the same direction as the disc 10a with twice the angular velocity. The cleaning disc 20a is sized and positioned as described above to ensure that the wiping contact between the cleaning pad 32a and the disc 10a is oriented radially with respect to the axis 16a.

FIG. 4 shows a second preferred embodiment which is similar to that of FIG. 3 except that the cleaning disc 20b is formed by a flexible disc 40 which serves to mount a flexible annular cleaning pad 32b. The operation of the embodiment of FIG. 4 is identical to that described above in conjunction with FIG. 3.

FIG. 5 shows a third preferred embodiment in which the cleaning disc 20c is rotated about an axis 34c by means of a drive mechanism 36c. In this embodiment, the axis 34c is positioned parallel to the axis 16c of the disc 10c. The cleaning disc 20c is similar to that described above in conjunction with FIG. 3. That is, the cleaning disc 20c includes a rigid disc 28c, a foam pad 30c, and a cleaning pad 32c which is annular in shape. Because the axes 34c, 16c are parallel, the cleaning disc 20c does not flex substantially in use.

In each of the embodiments of FIGS. 3 through 5, the angular velocities of the disc 10 and the cleaning disc 20 as well as the diameter and position of the cleaning pad 32 are selected as described above in conjunction with FIGS. 1 and 2 to provide radial cleaning actions.

FIGS. 6 through 11 show various views of a fourth preferred embodiment 100 which allows two cleaning discs to be used in order to provide successive washing and drying functions with the preferred radial cleaning action.

This fourth embodiment 100 is designed to clean a digital audio disc 102, and it includes a cover 106 which is hinged to a base 104. A disc rotation system 110 is mounted in the base 104. This disc rotation system 110 includes a motor 112 which rotates a worm 114. The worm 114 in turn rotates a worm gear 116 which is mounted for rotation to the base 104. A drive pulley 118 is mounted coaxially to turn with the worm gear 116. Two tabs 120 are positioned on the upper face of the drive pulley 118 extending away from the base 104. Both the worm gear 116 and the drive pulley 118 rotate about an axis 122. A platform 126 is mounted to the base 104 to rotate about an axis 124. This platform 126 is provided with a rubber sheet 128 at its upper edge. The outer perimeter of the platform 126 defines a pulley 130. A drive belt 132 is positioned around the pulley 130 and the drive pulley 118 such that rotation of the drive pulley 118 by the motor 112 causes rotation of the platform 126. The platform 126 is positioned to support the disc 102 and to rotate the disc 102 about the axis 124.

Figure 10:
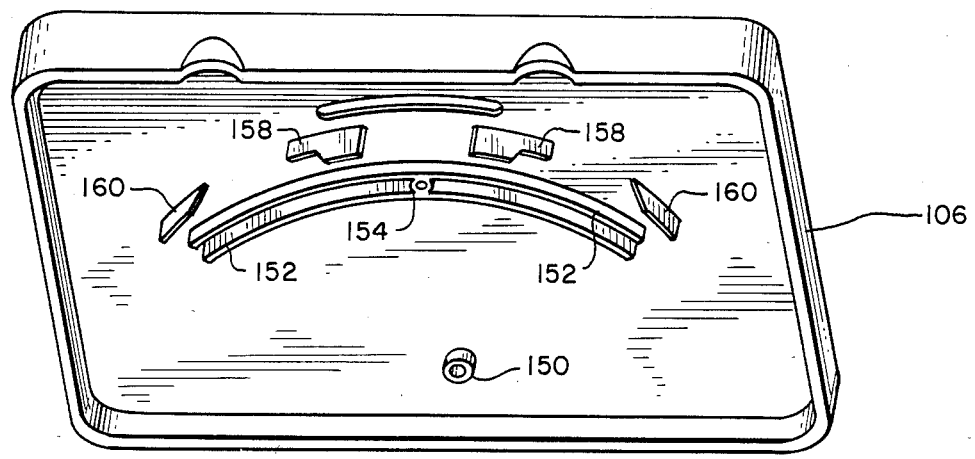
FIG. 10 is a perspective view of the under side of the cover of the embodiment of FIG. 6.

As best shown in FIG. 10, the inside surface of the cover 106 defines a hub 150 as well as an array of concentric ribs 152. A socket 154 is positioned between the ribs 152. Also mounted to the inner surface of the cover 106 are a pair of first cams 158 and a pair of second cams 160.

Figure 11:
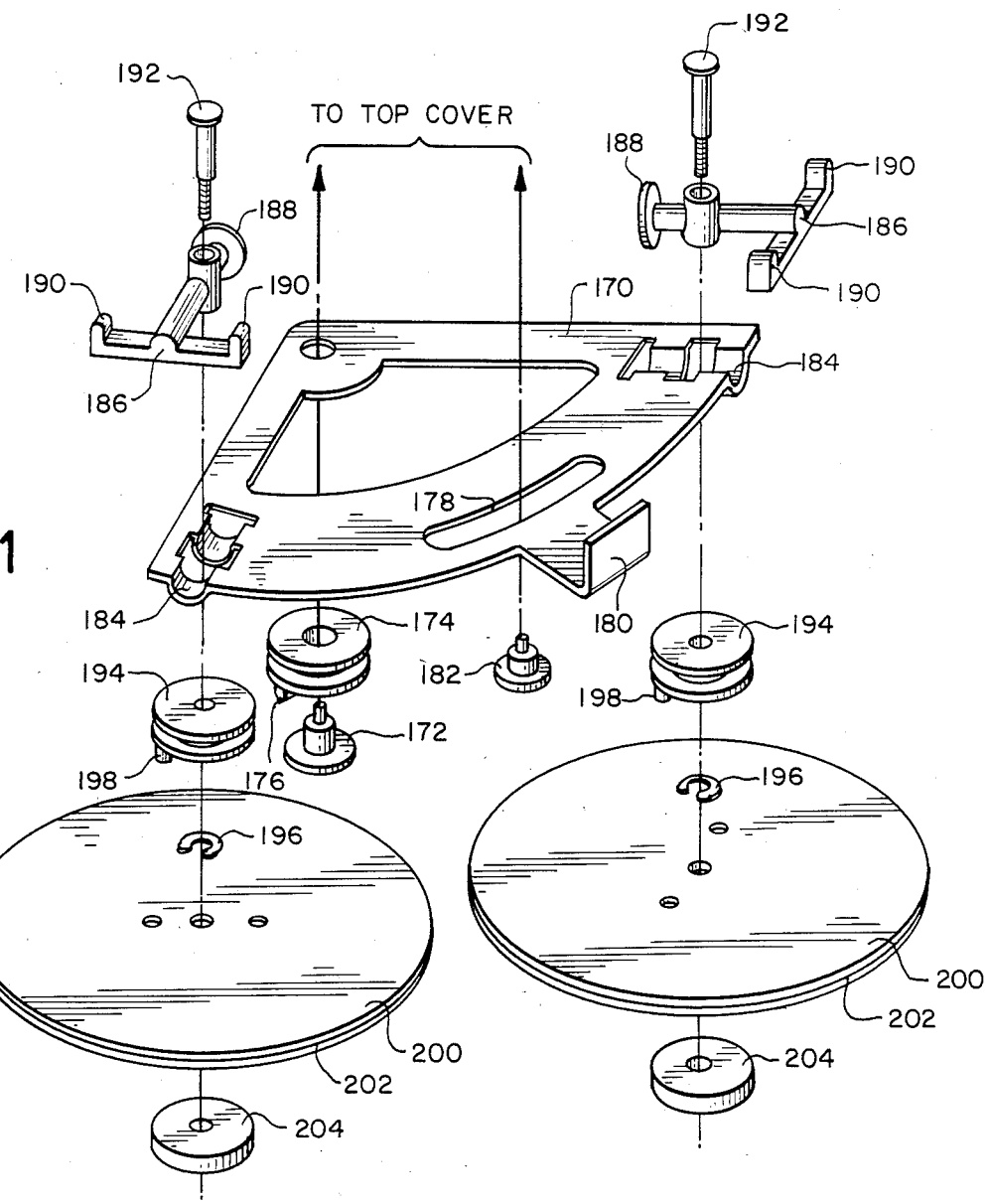
FIG. 11 is an exploded perspective view of portions of the embodiment of FIG. 6.

As best shown in FIG. 11, a pivot plate 170 is mounted to the cover 106 by means of a pivot stud 172 which is secured to the hub 150. The pivot stud 172 also mounts a drive pulley 174 for rotation. The drive pulley 174 is provided with a plurality of tabs 176 which extend away from the cover 106. When the cover 106 is in the closed position shown in FIG. 6, the pivot stud 172 is axially aligned with the axis 122 of the drive pulley 118. The tabs 120 engage the tabs 176 to transmit rotary motion from the drive pulley 118 to the drive pulley 174.

The pivot plate 170 also defines an arcuate slot 178 which defines a left end 178a and a right end 178b. A handle 180 extends radially away from te pivot stud 172. A retainer 182 extends through the arcuate slot 178 and is secured into the socket 154 of the cover 106. Thus, the retainer 182 limits the pivoting movement of the pivot plate 170 about the pivot stud 172.

The pivot plate 170 defines two spaced, radially oriented recesses 184. Each of these recesses 184 serves to pivotally mount a respective tilt arm 186. Each of the tilt arms 186 defines an end flange 188 which cooperates with the respective recess 184 to position the tilt arm 186 radially with respect to the pivot stud 172. The radially outer end of each tilt arm 186 terminates in a respective cam follower 190. The cam followers 190 are positioned to engage the first and second cams 158, 160. The interaction between the first and second cams 158, 160 and the cam followers 190 determines the angular position of the tilt arms 186.

Each of the tilt arms 186 supports a respective shaft 192. Each of the shafts rotatably supports a respective disc pulley 194 which is secured to the shaft 192 by means of a retaining ring 196. Each of the disc pulleys 194 defines at least one protruding pin 198. Two cleaning discs 200 are provided, each of which comprises a respective annular cleaning pad 202. In this preferred embodiment, each of the cleaning discs 200 is a flexible disc of the type described above in conjunction with FIG. 4. The discs 200 are held in place on the shafts 192 against the disc pulleys 194 by means of a threaded disc or other type retainer 204. Because the disc retainers 204 are threaded on the shafts 192, the cleaning discs 200 can readily be removed and replaced when necessary. Each of the cleaning discs 200 defines openings sized to receive the pins 198 to ensure positive engagement between the cleaning discs 200 and the disc pulleys 194.

A drive belt 210 extends around the disc pulleys 194 and the drive pulley 174 as shown in FIG. 8.

The operation of the embodiment in FIGS. 6 through 11 can best be understood by reference to FIGS. 7-9. As shown in FIGS. 7 and 8, when the pivot plate 170 is positioned such that the retainer 182 is positioned at the end 178a of the arcuate slot 178 the left hand one of the cleaning discs 200 (as seen in FIG. 8) is positioned properly to clean the disc 102 with a radial cleaning action. The tilt arm 186 of this left hand cleaning disc 200 is positioned by the first and second cams 158, 160 to tilt the cleaning disc 200 generally in the direction of the retainer 182. Simultaneously, the right hand one of the two cleaning discs 200 is positioned by the respective tilt arm 186 to be parallel to and spaced from the disc 102, thereby preventing any contact between the right hand cleaning disc 200 and the disc 102. In practice, the left hand disc 200 would be wetted with a cleaning solution and the left hand one of the cleaning disc 200 would be used to clean the disc 102 as the motor 112 rotates both the disc 102 and the cleaning discs 200.

After wet cleaning with the left hand cleaning disc 200 has been completed, with handle 180 can be used to move the pivot plate 170 until the retainer 182 is positioned in the right hand end 178b of the slot 178. When this is done it is the right hand one of the cleaning discs 200 as seen in FIG. 8 which is properly positioned to clean the disc 102 with a radial wiping action. When the pivot plate 170 is moved to the second position, the cams 158, 160 move the left hand cleaning disc 200 until it is parallel to, spaced from, and out of contact with the disc 102. Simultaneously, the right hand cleaning disc 200 is tilted generally in the direction of the retainer 182 in order to bring the right hand cleaning pad 202 into contact with the disc 102. Since this right hand cleaning pad 202 has not been wetted, it can be used to remove remaining traces of the cleaning solution from the surface of the disc 102. Once the disc 102 has been dried with this radial wiping action, the motor 112 can be de-energized and the cover 106 can be opened and the cleaned disc 102 removed for storage or play.

With regard to materials, standard injection molding techniques can be used to form most of the components of this embodiment. Of course, suitable metals should be used for shafts, retaining rings and the like. The cleaning pads 202 should preferably be formed of an absorbent material such as a cotton pile or felt. The diameters of the drive pulleys 118, 174, the pulley 130 and the disc pulleys 194 should be selected such that the cleaning discs 200 rotate with twice the angular velocity of the platform 126. In this preferred embodiment, the effective radius of the cleaning pads 202 is 2.1 inches, and the axis of rotation of the cleaning pads 202 is positioned such that the effective radius of the cleaning pads 202 passes through the axis 124 during cleaning or drying.

It should be apparent from the foregoing description that several disc cleaning devices have been disclosed which provide a radial wiping action between a cleaning disc and a disc to be cleaned, without oscillating movement of any type. The desired radial wiping action has been provided by combining two simple, uniform rotary motions which cooperate in a surprising manner to cancel tangential relative movement between the cleaning disc and the disc being cleaned. Thus, the desired radial cleaning action is provided in a particularly simple, effective and elegant manner.

Of course, it should be understood that a wide range of changes and modifications to the preferred embodiment described above will be apparent to those skilled in the art. For example, the widest possible range of drive mechanisms can be used, including manually powered as well as motor powered systems. Drive belts, gears, friction drives, and other types of drive mechanisms can be used. Furthermore, this invention can readily be adapted for use with other types of digital discs such as video discs or discs of other diameters. Of course, materials can be selected according to standard engineering principles. The two disc system described above in conjunction with FIGS. 6 through 11 can be replaced by a single disc system if either wet cleaning or drying is not desired. It is therefore intended that the foregoing detailed description be regarded as illustrative rather than limiting, and that it be understood that it is the following claims, including all equivalents, which are intended to define the scope of this invention.

I claim:

1. A disc cleaning device comprising:
   a disc support platform mounted to rotate about a first axis, said platform adapted to support a disc having a recorded area to be cleaned and to center the disc to be cleaned about the first axis;
   a cleaning disc surface mounted to rotate about a second axis, spaced from the first axis, said cleaning surface positioned to contact a disc to be cleaned supported on the platform;
   means for rotating the platform about the first axis; and
   means for rotating the cleaning surface about the second axis at a rate selected to ensure that the relative movement between the cleaning surface and the disc to be cleaned is oriented substantially radially with respect to the first axis to provide a substantially radial cleaning of at least the recorded area of the disc to be cleaned.

2. The invention of claim 1 wherein the cleaning surface rotates in the same direction as the platform, and wherein the cleaning surface rotates at a rate twice that of the platform.

3. The invention of claim 1 wherein the cleaning surface is annular and the effective radius of the cleaning surface is no less than half the radius of the disc to be cleaned.

4. the invention of claim 1 wherein the cleaning surface contacts the disc to be cleaned through an arc of at least about 45° as measured with respect to the second axis.

5. The invention of claim 4 wherein the relative movement between the cleaning surface and the disc to be cleaned is oriented radially inwardly, toward the first axis.

6. The invention of claim 4 wherein the relative movement between the cleaning surface and the disc to be cleaned is oriented radially outwardly, away from the first axis.

7. The invention of claim 1 wherein the cleaning surface contacts the disc to be cleaned through an arc of at least about 120° as measured with respect to the second axis.

8. The invention of claim 1 wherein the disc to be cleaned is a digital audio disc.

9. The invention of claim 1 wherein the first axis is parallel to the second axis, and wherein the cleaning surface is oriented parallel to the disc to be cleaned.

10. A disc cleaning device comprising:
    a disc support platform mounted to rotate about a first axis, said platform adapted to support a disc to be cleaned and to center the disc to be cleaned about the first axis;
    a cleaning surface mounted to rotate about a second axis, spaced from the first axis, said cleaning surface positioned to contact a disc to be cleaned supported on the platform;
    means for rotating the platform about the first axis; and
    means for rotating the cleaning surface about the second axis at a rate which varies as a function of the rate of rotation of the platform;
    the spacing between the first and second axes, the shape of the cleaning surface, and the rate of rotation of the cleaning surface with respect to the platform cooperating to ensure that the relative movement between the cleaning surface and the disc to be cleaned is oriented substantially radially with respect to the first axis to provide a substantially radial cleaning of at least an annular portion of the disc to be cleaned;
    wherein the second axis is tilted with respect to the first axis, and wherein the cleaning surface is flexible such that the cleaning surface bends when it comes into contact with the disc to be cleaned.

11. A disc cleaning device comprising:
    a base;
    a disc support platform mounted to the base for rotation about a first axis, said disc support platform adapted to support a disc to be cleaned;
    a cleaning disc mounted for rotation about a second axis separated from the first axis;
    an annular cleaning pad mounted on the cleaning disc to contact a disc supported on the platform, said cleaning pad comprising a circular portion having a radius such that the cleaning pad passes over the first axis;
    first means for rotating the platform about the first axis;
    second means for simultaneously rotating the cleaning disc about the second axis in the same direction as the platform and at an angular velocity twice that of the platform;
    said platform, cleaning disc, first means and second means cooperating to move the cleaning pad across a disc to be cleaned as the disc to be cleaned rotates on the platform, with substantially all wiping contact between the cleaning pad and the disc to be cleaned oriented substantially radially with respect to the first axis.

12. The invention of claim 11 wherein the disc to be cleaned is a digital audio disc.

13. The invention of claim 12 wherein the radius of the circular portion of the cleaning pad is no less than half the radius of the disc to be cleaned.

14. The invention of claim 12 wherein the radius of the circular portion of the cleaning pad is approximately equal to 2.1 inches.

15. The invention of claim 11 wherein the first and second axes are parallel and wherein wiping contact between the cleaning pad and the disc to be cleaned is directed radially outwardly in a first region and radially inwardly in a second region.

16. The invention of claim 11 wherein the second axis is skewed with respect to the first axis.

17. The invention of claim 16 wherein the wiping contact between the cleaning pad and the disc to be cleaned is directed radially outwardly.

18. The invention of claim 16 wherein the wiping contact between the cleaning pad and the disc to be cleaned is directed radially inwardly.

19. A disc cleaning device comprising:
a base;
a disc support platform mounted to the base for rotation about a first axis, said disc support platform adapted to support a disc to be cleaned;
two cleaning discs, each supporting a respective annular cleaning pad having an effective radius;
means for supporting the two cleaning discs such that any selected one of the two cleaning discs can be positioned to contact a disc to be cleaned with the selected cleaning disc positioned to overly the first axis;
first means for rotating the platform about the first axis;
second means for simultaneously rotating the selected disc in the same direction as the platform and at an angular velocity twice that of the platform;
said platform, selected cleaning disc, and first and second means cooperating to move the selected cleaning pad across a disc to be cleaned as the disc to be cleaned rotates on the platform, with substantially all wiping contact between the selected cleaning pad and the disc to be cleaned oriented substantially radially with respect to the first axis.

20. The invention of claim 19 wherein the disc to be cleaned is a digital audio disc.

21. The invention of claim 20 wherein the effective radius of the cleaning pad is no less than half the radius of the disc to be cleaned.

22. The invention of claim 20 wherein the effective radius of the cleaning pad is approximately equal to 2.1 inches.

23. The invention of claim 19 wherein the means for supporting the two cleaning discs comprises:
a pivot plate mounted to pivot about a pivot axis spaced from the first axis;
means for pivotably mounting the first cleaning disc to the pivot plate;
means for pivotably mounting the second cleaning disc to the pivot plate; and
means for tilting the first and second cleaning discs with respect to the pivot plate in accordance with the position of the pivot plate about the pivot axis such that when the pivot plate is in a first position a first one of the cleaning pads is positioned to overly the first axis and tilted to contact the disc to be cleaned and a second one of the cleaning pads is tilted to remain out of contact with the disc to be cleaned, and when the pivot plate is in a second position the first cleaning pad is tilted to remain out of contact with the disc to be cleaned and the second cleaning pad is positioned to overly the first axis and tilted to contact the disc to be cleaned.

24. The invention of claim 23 wherein the tilting means comprises:
a plurality of cam surfaces fixedly mounted with respect to the pivot axis; and
a plurality of cam followers, each mounted on a respective one of the cleaning pads to control the tilt of the cleaning pads in response to the cam surfaces.

25. The invention of claim 19 wherein the first and second means are driven by a common motor.

26. The invention of claim 19 wherein each of the first and second means comprises a respective belt drive system.

27. The invention of claim 19 wherein each of the cleaning discs is flexible such that the cleaning discs bend when they come into contact with the disc to be cleaned.

28. A disc cleaning device comprising:
a disc support platform mounted to rotate about a first axis, said platform adapted to support a disc to be cleaned and to center the disc to be cleaned about the first axis;
an annular cleaning surface mounted to rotate about a second axis, spaced from the first axis, said cleaning surface positioned to contact a disc to be cleaned supported on the platform, the effective radius of the cleaning surface being equal to the separation between the first and second axes;
means for rotating the platform about the first axis; and
means for rotating the cleaning surface about the second axis at a rate which varies as a function of the rate of rotation of the platform;
the spacing between the first and second axes, the shape of the cleaning surface, and the rate of rotation of the cleaning surface with respect to the platform cooperating to ensure that the relative movement between the cleaning surface and the disc to be cleaned is oriented substantially radially with respect to the first axis to provide a substantially radial cleaning of at least an annular portion of the disc to be cleaned.

29. The invention of claim 28 wherein the cleaning surface rotates in the same direction as the platform, and wherein the cleaning surface rotates at a rate twice that of the platform.

30. The invention of claim 28 wherein the effective radius of the cleaning surface is about 2.1 inches.

* * * * *